(No Model.)

L. R. KLEMM.
RELIEF MAP, CHART, &c.

No. 320,564. Patented June 23, 1885.

Witnesses:
W. A. Seward.
John R. Woods.

Louis Richard Klemm, Inventor
by James W. See, Attorney

UNITED STATES PATENT OFFICE.

LOUIS RICHARD KLEMM, OF HAMILTON, OHIO.

RELIEF MAP, CHART, &c.

SPECIFICATION forming part of Letters Patent No. 320,564, dated June 23, 1885.

Application filed April 27, 1885. (No model.)

*To all whom it may concern:*

Be it known that I, LOUIS RICHARD KLEMM, of Hamilton, Butler County, Ohio, have invented certain new and useful Improvements in Maps, Charts, &c., of which the following is a specification.

This invention pertains to maps, charts, &c., and has a special value in connection with such articles when they are used as educational appliances. Instructions to pupils may be given from complete maps, for instance, but such a map would lose much of its efficiency by reason of its confusing multiplicity of detail. It is desirable that the pupil's mind may be centered upon the particular matter under consideration, and that the instruction may proceed by step-by-step development upon the map, the various matters being sketched into the map as the instruction proceeds; and it is further desirable that such map may be restored to its original condition, and the matters of instruction demonstrated graphically by the pupil. A mere outline delineation—that is, an outline of a body whose figure is not shaded—is unsatisfactory, for the reason that in many matters it is impossible to distinguish what is figure and what is a mere background.

My invention will be readily understood from the following description, taken in connection with the accompanying drawings, in which—

Figure 3:
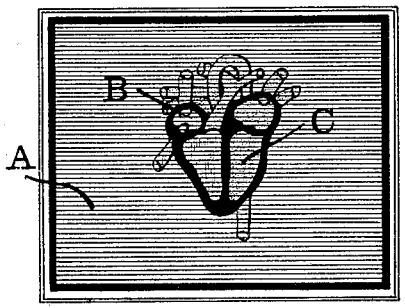
Figure 4:
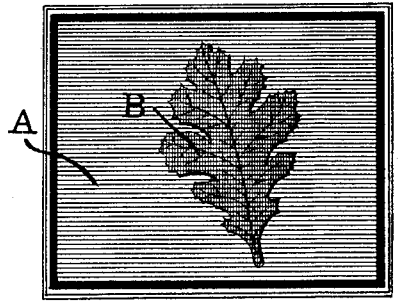
Figure 1:
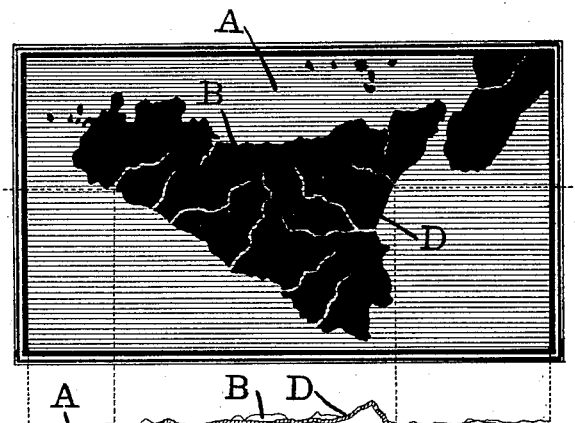
Figure 2:
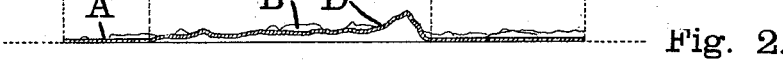

Figure 1 is a plan of a relief-map embodying my improvements; Fig. 2, a longitudinal vertical section of the same upon line *a*; Fig. 3, a plan of a physiological chart illustrating my improvements, and Fig. 4 a plan of a botanical chart illustrating my improvements.

In this specification I will make use of the words "ground" and "body." By ground I mean the apparent surface upon which the body is delineated, and by body I mean the thing delineated upon the ground.

In the case of maps land may be called the "body," and the sea may be called the "ground," in cases where more or less isolated bodies of land are depicted in surrounding water—as, for instance, an island in the sea—and the land may be the ground and the water the body in cases where an isolated body of water is depicted as surrounded by land—as, for instance, a lake in a continent.

In the drawings, A represents the ground of my improved map, chart, or the like, such ground being a prepared or natural waterproof cleansable surface adapted to receive marks from a crayon or the like, and to have the same removed ready for the reception of new marks; B, a body depicted on the ground, such body having a tint or color contrasting more or less with the tint or color of the ground, and having a prepared or natural water-proof cleansable surface adapted for marking and cleaning the same as the ground; C, (in Fig. 3,) a body portion differing in tint or color from neighboring body portions, and D (Figs. 1 and 2) a body portion thrown into relief, as is common in relief maps.

In constructing my improved maps, charts, &c., the ground may be of natural slate, or it may be prepared slating laid upon suitable sheet, or it may be of celluloid, or it may be prepared with silicate or any other material which is water-proof, and which is adapted to receive a succession of markings and cleansings, and it may be of any appropriate or desired color or tint. The body is to be like the ground, except in the matter of color or tint; and it may be produced by being superposed upon the ground or by being inlaid in the ground; or, in the case of slate, the body may be of natural slate used in combination with an applied ground of properly contrasting color or tint.

Either the body or the ground, or both, may, instead of being of a single color or tint, comprise several colors or tints in proper contrast with each other. In case the body or the ground is in relief, the depiction may be sufficient without the use of any contrasting colors or tints, and in such case the color or tint of the entire surface of the chart or map may be uniform.

These maps, charts, or the like, may be given the form of permanent blackboards, wall-hangings, tablets, loose sheets, or bound books.

The depiction upon the map or chart may be as complete or incomplete as is desired; but it is at all times desirable that there shall be present that degree of incompleteness of depiction which will permit of the development of further completeness by the use of crayons or the like. Such development may consist in locating and naming localities, and properties, and characteristics, and directions of motion.

In using my improved maps, charts, &c., the proper demonstrations are made upon them with crayons or the like, after which such demonstrations may be obliterated, leaving the chart or map in condition for the reception of the same demonstration by the same party or another party, or for other and entirely new demonstrations, the perspicuity of which will not be lessened by reason of previous non-pertinent demonstrations.

I claim as my invention—

1. As a new article of manufacture, a map, chart, or the like, having a contrasting body and ground formed with a water-proof cleansable surface adapted to receive obliterative crayon or other marks, substantially as and for the purpose set forth.

2. As a new article of manufacture, a map, chart, or the like, having a body and ground formed with a water-proof cleansable surface adapted to receive obliterative crayon or other marks, the body being thrown into relief or superficial projection with reference to the ground, substantially as and for the purpose set forth.

3. As a new article of manufacture, a map, chart, or the like, constructed in relief and having a slated surface, substantially as and for the purpose set forth.

4. As a new article of manufacture, a map, chart, or the like, having a slated surface in three or more tints or colors, substantially as and for the purpose set forth.

LOUIS RICHARD KLEMM.

Witnesses:
J. W. SEE,
W. A. SEWARD.